July 10, 1956  D. S. MAISEL  2,754,343
ADSORPTION PROCESS
Filed May 29, 1953
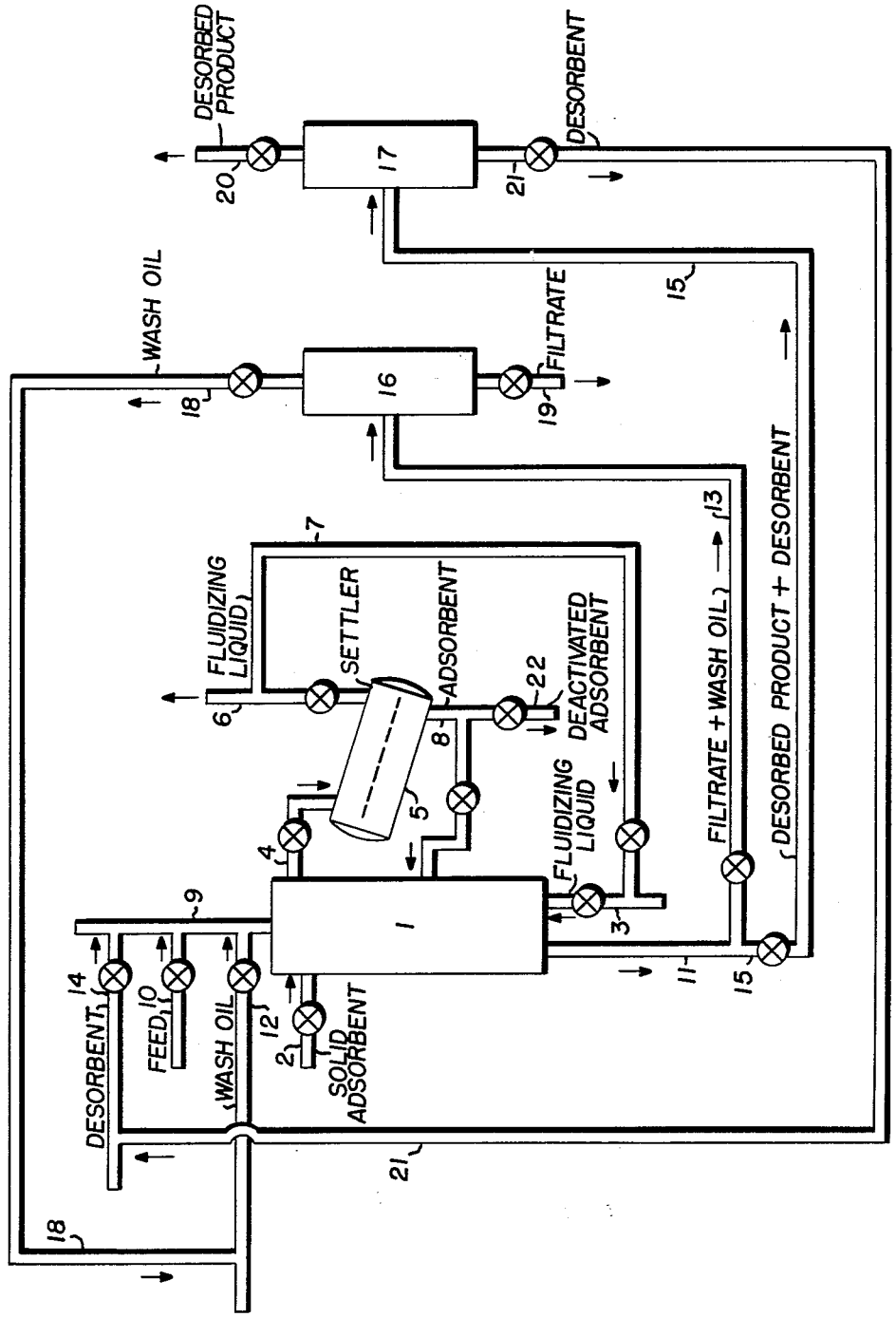
Daniel S. Maisel   Inventor
By *Henry Berk* Attorney United States Patent Office 2,754,343
Patented July 10, 1956

2,754,343

ADSORPTION PROCESS

Daniel S. Maisel, Union, N. J., assignor to Esso Research and Engineering Company, a corporation of Delaware Application May 29, 1953, Serial No. 358,430

9 Claims. (Cl. 260—674)

This invention relates to an improved fixed bed adsorption process for the separation of mixtures into components thereof. The invention is particularly applicable to the so-called self-regenerative cyclic adsorption process, e. g., the well-known silica gel process for the separation of aromatic hydrocarbons from non-aromatic hydrocarbons.

The use of a solid adsorbent such as silica gel to separate a feed mixture into its components by percolating the feed through a column of the adsorbent has long been known. Thus, the use of silica gel or other adsorbent as a means of separating aromatic hydrocarbons from a mixture of aromatics and paraffins has long been recognized. The recovery of aromatic hydrocarbons from such mixtures has recently been improved by the development of a cyclic self-regenerative type of adsorption process.

It is an object of this invention to provide for improved packing of a column by classification of adsorbent particle sizes in a fixed bed adsorption process.

It is another object of this invention to control liquid distribution problems in a cyclic adsorption process.

It is a further object of this invention to prevent channeling or maldistribution in a bed of adsorbent in an adsorption process.

It is also an object of this invention to selectively remove deactivated adsorbent from a bed of adsorbent contained in a column without opening the adsorption column.

These and other objects of this invention will be more apparent from the description to follow:

Development studies on the cyclic adsorption process with particular application to the recovery of aromatic hydrocarbons from mixtures thereof with other hydrocarbons, have shown that results obtained in small laboratory columns are not duplicated in larger size units due to poor liquid distribution. One of the causes for the poor performance obtained with large diameter columns is inefficient packing of the adsorbent in the adsorption bed. Techniques which have been tested to control this problem have included careful classification of adsorbent particle size before the introduction into the column, slurry packing of the bed, and pre-wetting of increments of adsorbent. When applied to commercial processes, these methods are relatively expensive.

The data in the following table typify the operations of laboratory and larger size columns and the differences therein are apparent:

| | Laboratory Unit (Good Liquid Distribution) | | Larger Unit (Poor Liquid Distribution) |
|---|---|---|---|
| Column Dimensions | 1″ x 10′ | | 6′ x 40′ |
| Charge (Vol. percent): | | | |
| Benzene | 10.8 | 6 | 5.1 |
| Saturates ($C_8$) | 89.2 | 94 | 94.9 |
| Wash Liquid: | | | |
| Aromatics | 46 | 46 | 47.4 |
| Saturates | 54 | 54 | 52.6 |
| Benzene Recovery (percent) | 97 | 70 | 20 |
| Benzene Purity (percent) | 99+ | 99+ | 98.5 |

These data show the effect of feed stock concentration upon the amount recoverable from a given column with a feed rate of 0.14 gal. feed/lb. gel for each case and 0.15 gal. wash oil/lb. gel for the commercial column vs. 0.1 gal. wash oil/lb. gel for the laboratory column. Adsorbent in each case was 28–200 mesh Davison silica gel. The effect of gel deactivation and of poor liquid distribution is pointed up by the difference in recovery obtained in the laboratory and the larger size units.

According to this invention solid adsorbent of non-uniform particle sizes is added to a fixed bed column to a desired level. The method of adding the adsorbent is unimportant. When a required amount of solid is present in the column, the liquid feed to be separated, a solvent liquid, or any fluidizing liquid is employed to back-wash the column. The liquid must be dry and free of de-activating materials such as olefins, diolefins or peroxides. For this purpose solvent-liquid which has been previously used in the process is an evident choice. Back-wash is accomplished by sufficient flow of the liquid to fluidize the packed bed. This entails forcing the liquid upwardly through the bed at the desired rate of flow. The adsorbent particles which may vary over a wide range of particle size, e. g., 20 to 200 mesh, are fluidized by means of the up-flowing liquid stream. By proper adjustment of the rate of flow it is possible to obtain classification with respect to adsorbent particle sizes. The larger particles will settle to the bottom while the smaller sizes will rise and be concentrated at the top of the column. When the proper distribution is obtained the fluidizing liquid stream is cut off and the adsorption separation process cycle begins as will be related below. In addition to the classification, all of the particles will be entirely wetted with the fluidizing liquid. Therefore liquid distribution problems due to entrapped air, poor particle size distribution or uneven packing are eliminated.

Another feature of the invention is concerned with the use of the fluidizing liquid after the adsorption process has been operating for a number of cycles. After successive cycles of adsorptions and desorptions the upper part of the bed becomes deactivated. In the operation of a large size column for the separation of aromatics from paraffins employing silica gel, samples of gel after a number of cycles were taken from the column at the same time from various sections of the column. One sample was removed from the top, another from one foot below the surface, another from a point situated ⅓ of the distance above the bottom of the bed and other from the bottom of the bed. The two top samples were severely deactivated while the lower samples were about as active as fresh gel. The second phase of the present invention therefore provides a means for removing deactivated adsorbent. In such process the adsorption-desorption cycles are halted and fluidizing liquid is again pumped up-flow through the bed. The rate of flow of fluidizing liquid is adjusted to carry over to a settling tank those particles which have become deactivated. This is possible because it has been found that deactivation is a function of particle size as a result of the bed arrangement. Fresh adsorbent of an appropriate size range is then used to replace the removed deactivated adsorbent. The range of sizes of deactivated particles elutriated from the column is controlled by the rate at which the fluidizing liquid is fed to the column.

A variation of the above process permits use of a wide range of adsorbent particle sizes, including a large amount of fines, such that if used in a column directly, excessive pressure drop during the down-flow adsorption-desorption cycles would occur. In this case, the bed is initially charged with the adsorbent and sufficient fines are taken overhead by means of the fluidizing liquid to give a satisfactory bed. The smaller particles so removed represent an ideal fraction for addition to the column after removal of deactivated adsorbent.

The following advantages are inherent in operations of the type just described:

(1) A much wider range in particle sizes can be tolerated than if the bed were packed by conventional means.

(2) Liquid distribution due to particle size classification is greatly improved over random arrangement.

(3) Deactivated gel is selectively removed without opening the column. This reduces off-stream time and greatly reduces the formation of peroxides which are conducive to deactivation of the adsorbent.

(4) Adsorbent particles are thoroughly wetted by the liquid and the presence of troublesome air or vapor pockets is avoided. Thus, good liquid distribution and high recoveries are assured.

(5) Particle size classification provides a safety feature of a conventional "guard chamber" within the column.

The improvements described in this application are applicable to conventional adsorption processes particularly the separation of hydrocarbons according to chemical type by selective adsorption, and more particularly, the separation of aromatics from other hydrocarbons such as olefins, naphthenes, and paraffins, or the separation of olefins from paraffins, etc. The use of the adsorption process is also applicable to the treatment of lube oils for V. I. improvement, to the treatment of naphthas for octane improvement, to the removal of sulfur compounds and aromatic hydrocarbons from kerosenes, for the concentration of cyclohexane and for the removal of sulfur and halides from mixtures contaminated therewith. The process is not restricted to the use of silica gel as the adsorbent. Silica gel is the preferred adsorbent for the recovery of aromatic hydrocarbons from streams containing them. Other solid adsorbents such as activated alumina, magnesia, activated carbons or mixtures of the same may be employed depending upon the nature of the adsorption and the separation desired. The invention is therefore applicable to any process involving adsorption of the type wherein a solid adsorbent in a fixed bed is contacted with a liquid stream.

The invention will be more fully understood with reference to the attached drawing which is a semi-diagrammatic sketch of one type of apparatus suitable for carrying out the process.

Referring to the drawing, column 1 is packed by means of the addition thereto of a solid adsorbent such as silica gel. The gel is added to the column via line 2 either in solid form or as a liquid slurry as previously related. Adsorbent of wide size particle range, e. g., 20 to 200 mesh is employed. When the column is packed to the desired level a fluidizing liquid is pumped into the bottom of the column via line 3.

Sufficient liquid is added and under sufficient pressure to suspend the particles in the liquid rising past the particles. Due to this fluidizing action the particles become classified with the smallest particles rising and settling at the top of the column. The coarser or larger particles settle at the bottom of the column. The fluidizing liquid is removed from an upper portion of the column above the level of the bed of adsorbent and is removed via line 4 to a settler 5. In the settler any solid particles separate from the fluidizing liquid. The fluidizing liquid is removed from the settler via line 6 and is returned for further use by recycle line 7. Adsorbent is returned to the column when desired via line 8.

After the particles of adsorbent have been properly classified in the bed and with the particles still wet with the fluidizing liquid, the adsorption-desorption cycles are initiated. Thus, a hydrocarbon mixture comprising approximately 95% hexane and 5% benzene is introduced into the column of silica gel from line 10 via line 9 into the top of the column and is flowed downwardly through the column. Silica gel having a greater adsorptive affinity for aromatic hydrocarbons picks up the aromatics from the liquid.

In the preferred operation the aromatic hydrocarbon-containing feed is added to the column until the bed of silica gel is approximately 50 to 80% saturated. The extent of this saturation can be readily obtained by knowing the amount of gel in the column and the extent to which the gel can adsorb aromatics before aromatics appear in the filtrate. Simple laboratory experiments will determine this. When the desired saturation is reached the feed is shut off. Desorbent is then passed down the column before any of the feed aromatic emerges from the bottom of the column. The desorbent plus the desorbed aromatic product is removed from the column via lines 11 and 15 and sent to fractionator 17 for separation as will be related below. Alternatively, before the desorbent is introduced into the column, an intermediate wash liquid may be used such as butane or pentane. This wash oil is introduced into the column via lines 12 and 9. The wash oil proceeds to pass down the column washing any occluded hexane from the column. The wash oil and filtrate are continually removed via lines 11 and 13 and sent to fractionating column 16. This procedure allows further fractionation to take place prior to the desorption step.

With the gel saturated with benzene the desorption cycle is initiated. Desorbing liquid, preferably an aromatic concentrate boiling over a different range from the aromatic feed stream, e. g., a higher molecular weight aromatic such as toluene or xylene mixtures is introduced via lines 14 and 9 to the top of the column. Desorption of the benzene occurs both by means of the greater affinity of the silica gel for the desorbing liquid and because the concentration of benzene in the desorbent is low. The greater the affinity of the silica gel for the desorbent, the smaller is the amount required for desorption. The desorbed product benzene and the desorbing liquid are removed from the column via lines 11 and 15 and sent to fractionator 17. When benzene removal is complete the desorption cycle is shut off and the adsorption cycle repeated. In fractionator 16 the wash oil is distilled overhead away from the normal hexane which is removed as a bottoms product via line 19. The bottoms product is further fractionated for separation of hexane from any desorbent which is recycled via lines 21 and 14 to the column when needed, in a manner not shown. The wash oil is returned via line 18 to the column when needed via line 12. Fractionator 17 separates the benzene from the desorbing liquid. Benzene is recovered overhead via line 20 as a desorbed product and sent to storage. The desorbing liquid for example, mixed xylenes, is recovered as bottoms via line 21 and returned when needed to desorbent line 14.

The liquid used to fluidize and wet the adsorbent is preferably chosen after consideration of the separation which is being effected in the column. For example, in the separation of aromatic hydrocarbons from a mixture thereof with non-aromatics, the liquid employed is preferably an aromatic hydrocarbon concentrate having a boiling range different from that of the aromatic in the feed stock undergoing separation. For example, if benzene recovery is the purpose of the separation, a xylene concentrate is the preferred fluidizing liquid. If toluene or xylene recovery is the purpose of the separation, benzene is a good choice as the fluidizing liquid. In the above separations a paraffin hydrocarbon or mixture of paraffins could also be used but it is not preferred. It is also possible to use the feed mixture itself as the fluidizing and wetting liquid but the disadvantage of this is that if it has impurities in it, these impurities are imparted to the solid adsorbent.

In the treatment of kerosene for the removal of sulfur compounds and aromatic hydrocarbons therefrom, a $C_8$—$C_9$ aromatic concentrate is an excellent material as a fluidizing and wetting agent. This same material can also be used in the purification of white oils to remove unsaturates and oxygenated compounds.

After a number of cycles, say 100 to 300 cycles, the silica gel adsorbent will become partially deactivated. As previously related it has been found that the smaller particles at the top of the column 1 are the ones very severely deactivated by the deactivants, such as phenolic materials, peroxides, and unsaturated hydrocarbons which undergo polymerization. When such a state exists, the adsorption-desorption cycle is halted and fluidizing liquid introduced into the bottom of the tower via line 3. The fluidizing liquid operates in the same manner as in the previously related classification action, and washes the smaller particles out of the top of the bed via line 4 to the settler. The settler operates in the same manner as previously related and deactivated adsorbent is removed from the system via line 22. Make-up gel is added via line 2 and the adsorption-desorption cycle is again begun. Alternatively, the deactivated gel may be submitted to regeneration by treatment with steam, by solvent extraction, etc. Thus fine particles elutriated from the adsorbent column are reactivated and reintroduced into the column. This allows continual use of a given charge of adsorbent without the necessity for providing a new supply of fines for addition to the column. Since reactivation is probably limited by diffusion rates in the solid, it is an added advantage to reactivate only the smaller size particles of adsorbent.

Although the invention has been described with the illustration of only one adsorption vessel, a number of gel cases can be operated in series with the proceeds on a continuous basis.

What is claimed is:

1. In a process wherein a feed liquid is separated into components by means of contact with a solid adsorbent of relatively wide range particle sizes in an adsorption zone wherein the liquid is passed downwardly through the adsorbent particles and wherein one of the components of the liquid is more strongly adsorbed by the adsorbent, the improvement which comprises contacting the dry adsorbent particles with an up-flow stream of fluidizing liquid at a liquid rate sufficient to fluidize and classify the adsorbent particles so that the smaller sized particles rise to the top of the adsorption zone, and whereby the adsorbent particles become wetted with the fluidizing liquid, and thereafter contacting the adsorbent so treated with feed liquid.

2. A process according to claim 1 in which the solid adsorbent is silica gel of 20 to 200 mesh particle sizes.

3. A process for separating aromatic hydrocarbons from a hydrocarbon mixture containing aromatic hydrocarbons and non-aromatic hydrocarbons which comprises forming an elongated column of silica gel of relatively wide range particle sizes in an adsorption zone, passing a fluidizing liquid essentially free of deactivants upwardly through said column at a liquid rate sufficient to fluidize and to concentrate the smaller particles at the top of the column, passing the hydrocarbon mixture in liquid phase downwardly through the column of silica gel to preferentially adsorb aromatic hydrocarbons therefrom and to yield a liquid of reduced aromatic hydrocarbon content, passing a desorbent liquid downwardly through the column of silica gel containing adsorbed aromatic hydrocarbons in amounts sufficient to desorb the aromatic hydrocarbons therefrom, recovering a product enriched in aromatic hydrocarbon content, thereafter repeating the adsorption-desorption cycle until the relatively small particles in the upper part of the adsorbent column become selectively deactivated, and selectively replacing said deactivated particles with active particles.

4. A process according to claim 3 in which the hydrocarbon mixture containing aromatic and non-aromatic hydrocarbons boils within the gasoline and kerosene boiling range.

5. A process according to claim 3 in which a stream of low boiling paraffin hydrocarbons is passed as a wash liquid downwardly through the column prior to treatment of the silica gel with desorbent liquid.

6. A process according to claim 3 in which the desorbent liquid is an aromatic hydrocarbon having a different boiling range from the aromatic hydrocarbon contained in the hydrocarbon mixture.

7. A process according to claim 3 in which deactivated silica gel particles are selectively removed from the silica gel column between adsorption-desorption cycle by passing fluidizing liquid upwardly through the column of silica gel at a velocity sufficient to force the smaller deactivated particles out of the top of the column.

8. In a process wherein a feed liquid is separated in an adsorption zone into at least two components by contact with a mixture solid adsorbent particles having a relatively wide particle size distribution and having a relatively high amount of fines conducive to causing an excessive pressure drop, the imrovement which comprise charging said mixture of adsorbent particles into a closed adsorption zone, passing a fluidizing liquid essentially free of deactivants upwardly through said particles in said adsorption zone at a rate sufficient to classify said particles according to size until enough fines are carried out of said adsorption zone to provide therein a fixed bed of satisfactory pressure drop, recovering the entrained active fines in an external separation zone, passing feed liquid downwardly through said bed of classified adsorbent particles in said closed adsorption zone, thereafter passing a desorbent liquid through said bed in an amount sufficient to desorb the adsorbed component, recovering a product containing said desorbed component, then again passing a fluidizing liquid essentially free of deactivants upwardly through said bed at a rate sufficient to entrain deactivated adsorbent fines out of the closed adsorption zone, and replacing the deactivated fines by the previously recovered active adsorbent fines.

9. A process for separating a feed liquid into a relatively less adsorbable and a relatively more adsorbable component by contact with solid adsorbent particles having a relatively wide particle size distribution which comprises disposing said adsorbent particles in a closed adsorption zone in such a manner that a fixed bed is formed having relatively coarse particles concentrated at the bottom and relatively fine ones at the top, passing said liquid downwardly through said fixed bed until the upper portion of said bed becomes selectively deactivated, and removing adsorbent particles from said deactivated portion of said bed by passing a liquid essentially free of deactivating materials upwardly through said bed in said closed adsorption zone at a velocity sufficient selectively to entrain said deactivated fine particles out of said adsorption zone.

References Cited in the file of this patent

UNITED STATES PATENTS

| 2,509,486 | Danforth | May 30, 1950 |
| 2,554,908 | Hirschler | May 29, 1951 |
| 2,567,207 | Hoge | Sept. 11, 1951 |

OTHER REFERENCES

Perry: Chemical Engineers Handbook, 3rd ed. (1950), McGraw-Hill Book Company, Inc. New York, N. Y., page 1068.